United States Patent [19]

Henderson, Jr.

[11] Patent Number: 5,350,017
[45] Date of Patent: Sep. 27, 1994

[54] ELASTOMERIC SEAL WITH REINFORCING RING

[75] Inventor: Herman O. Henderson, Jr., Houston, Tex.

[73] Assignee: ABB Vetco Gray Inc., Houston, Tex.

[21] Appl. No.: 45,405

[22] Filed: Apr. 9, 1993

[51] Int. Cl.⁵ .............................................. E21B 23/02
[52] U.S. Cl. ..................... 166/208; 277/163
[58] Field of Search ............... 166/206, 348, 368, 208; 277/153, 31, 30, 163, 164, 188 A, 188 R, 356

[56] References Cited

U.S. PATENT DOCUMENTS

| | | | |
|---|---|---|---|
| 595,811 | 12/1897 | Katzenstein | 277/163 |
| 701,730 | 6/1902 | Irons | 277/163 |
| 909,983 | 1/1909 | Bömcke | 277/163 |
| 2,957,717 | 10/1960 | Bram | 277/163 |
| 3,094,337 | 6/1963 | Pippert et al. | 277/188 A |
| 4,219,204 | 2/1980 | Pippert | 277/188 A |
| 4,298,067 | 11/1981 | Lawson | 166/348 X |
| 4,428,590 | 1/1984 | Pippert et al. | 277/188 A |
| 5,163,514 | 11/1992 | Jennings | 166/368 |

*Primary Examiner*—Ramon S. Britts
*Assistant Examiner*—Frank S. Tsay
*Attorney, Agent, or Firm*—James E. Bradley

[57] ABSTRACT

A seal for an oil well apparatus has reinforcing rings embedded within the seal. The seal is elastomeric. The apparatus has an energizing device that deforms the seal to cause it to move radially outward to a set condition. The reinforcing ring does not expand during this radial movement. The reinforcing ring is preferably a cable and is located near the inner diameter of the seal. The seal may also have anti-extrusion rings at the outside corners, which are flexible coil springs. Each anti-extrusion ring is a coil spring with a core of material that has a hardness greater than the hardness of the body of the seal.

18 Claims, 1 Drawing Sheet

ELASTOMERIC SEAL WITH REINFORCING RING

BACKGROUND OF THE INVENTION

1. Field of the invention

This invention relates in general to well tools used in subsea wells, and in particular to an elastomeric seal which has reinforcing rings.

2. Description of the Prior Art:

In subsea well drilling, operations occur wherein a tool must be lowered through a blowout preventer in a riser, then used to seal against a bore, such as in a subsea wellhead housing. In one instance, it is a good practice to test the blowout preventer by closing the blowout preventer on drill pipe while applying pressure below the drill pipe. The tool at the lower end of the drill pipe seals the bore of the wellhead housing to allow the blowout preventer to be tested. This test also tests the seal of the wellhead connector to the subsea wellhead housing.

In U.S. Pat. No. 5,163,514, Nov. 17, 1992, Charles E. Jennings, an isolation test tool is described for performing the above test. That tools lowers through the blowout preventer and seals in the wellhead housing. The seal is elastomeric, and is set by axial compression.

While workable, frequently, the seal will be pulled off the tool as the tool passes through the blowout preventer stack while the test tool is being retrieved. After pressure is removed from the blowout preventer, the elastomeric portion of the preventer tends to encroach into the riser bore. A combination of mechanical grip, friction, and differential pressure will often stretch and roll the seal out of its groove. This necessitates retrieving the seal from the well. Usually that can be handled by circulation of fluid to float the seal to the surface. However, there is a danger that the seal will catch on downhole structure, making it difficult to retrieve. Also, normally, the seal will be damaged and cannot be reused. Tools other than isolation test tools also have similar problems in retaining elastomeric seals, such as some casing hanger running tools.

It is known to utilize coil springs at the outside corners of the elastomeric seals. These coil springs serve as anti-extrusion members to prevent the seal from extruding axially while set and under test pressure. The coil springs, however, have essentially no circumferential tensile strength so as to avoid interfering with the radial expansion of the seal during energizing. The anti-extrusion rings allow the seal to stretch and be pulled out of its groove upon retrieving of the test tool.

SUMMARY OF THE INVENTION

The elastomeric seal of this invention utilizes at least one annular reinforcing ring embedded within the seal. The reinforcing ring has sufficient tensile strength to be nonexpansible during normal operations to prevent the seal from stretching as the isolation test tool is retrieved from the well.

Preferably, the reinforcing ring is a metal cable. Also, preferably two of the reinforcing rings are utilized, one at each inside corner. Anti-extrusion coil springs may be employed at the outside corners. The coil springs have cores of an elastomer that has a greater hardness than the seal.

DETAILED DESCRIPTION OF THE INVENTION

Figure 1:
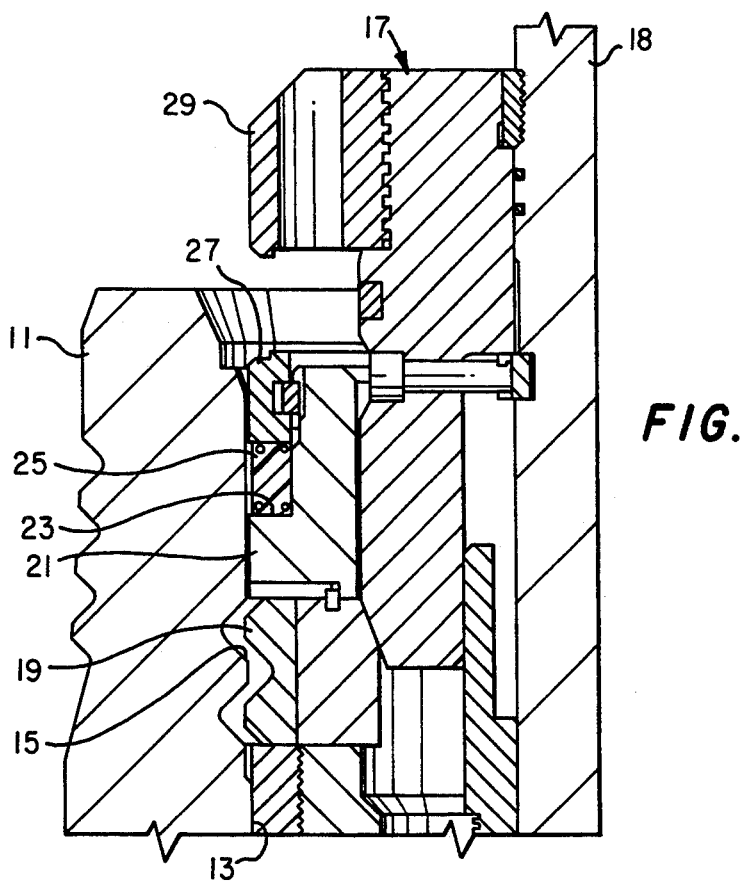
FIG. 1 is a partial quarter sectional view illustrating an isolation test tool having a seal constructed in accordance with this invention, and shown prior to being energized.

Referring to FIG. 1, a wellhead housing 11 will be located at the sea floor. Wellhead housing 11 has a bore with an inner cylindrical wall 13. A set of grooves 15 are formed in inner wall 13. Wellhead housing 11 will be connected to a wellhead connector and riser (not shown) which extend to a surface vessel.

An isolation test tool 17, shown only partially, is shown located inside wellhead housing 11 in preparation for a test. Test tool 17 is shown and described fully in U.S. Pat. No. 5,163,514, Nov. 17, 1992, Charles E. Jennings, all of which material is hereby incorporated by reference. Test tool 17 has a split ring 19 which is urged out into grooves 15 to lock test tool 17 into wellhead housing 11.

Test tool 17 has a mandrel 18 and an outer portion 21 with a cylindrical exterior that is of a slightly smaller outer diameter than the inner diameter of wellhead housing inner wall 13. A shoulder 23 is formed at the upper end of outer portion 21. Shoulder 23, as shown in FIG. 2, includes a cylindrical portion 23a that faces outward and a lower surface 23b that faces upward.

An elastomeric seal 25 is carried on shoulder 23 for sealing against wellhead housing inner wall 13. Seal 25 moves between its natural position, as shown in FIGS. 1 and 2, to the energized position shown in FIG. 3. The means for energizing seal 25 includes compression ring 27 located above seal 25. A compression flange 29 carried by mandrel 18 above compression ring 27 is subsequently moved downward relative to outer portion 21. This downward movement moves compression ring 27 downward to apply an axial force on seal 25 as shown in FIG. 1.

Figure 2:
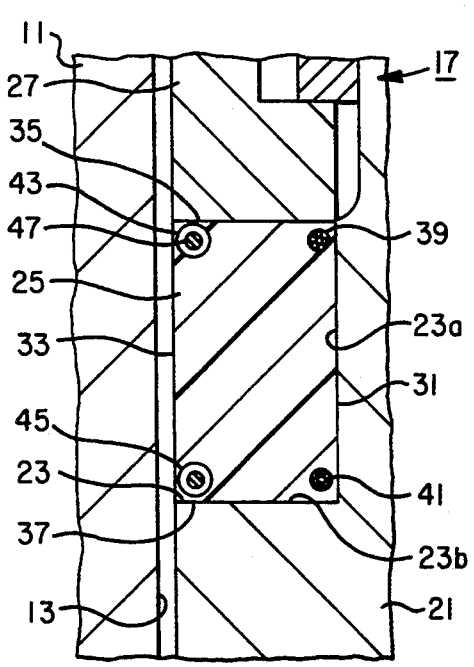
FIG. 2 is an enlarged partial sectional view of the test tool of FIG. 1, showing the seal prior to being energized.
Figure 3:
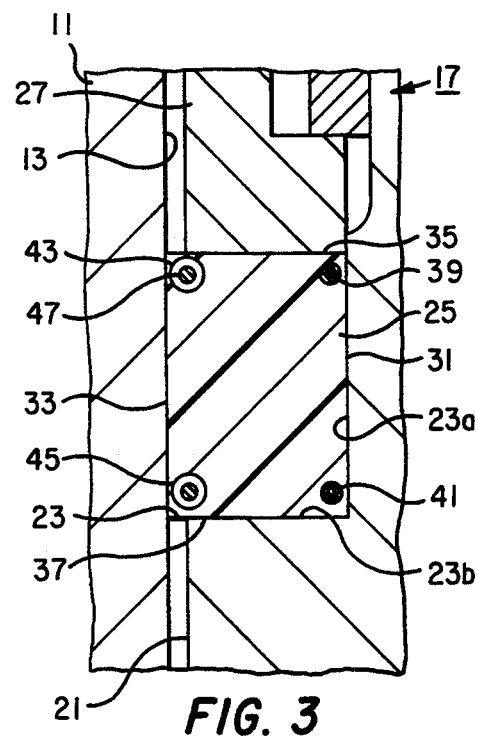
FIG. 3 is an enlarged partial sectional view of the test tool of FIG. 1, showing the seal in its sealing or energized condition.

Referring particularly to FIGS. 2 and 3, seal 25 has an inner diameter or surface 31 that engages shoulder cylindrical portion 23a. Seal 25 has an outer diameter or surface 33 that is cylindrical and in its undeformed condition, is spaced inward from wellhead housing wall 13 by a slight clearance. The clearance is preferably about one-tenth of an inch on a side, or one-fifth of an inch difference in diameters. In the undeformed condition, outer surface 33 is substantially flush with the outer cylindrical wall of tool outer portion 21. Seal 25 has a flat top surface 35 that faces upward and is contacted by compression ring 27. Seal 25 has a flat bottom surface 37 that faces downward and is supported on shoulder lower surface 23b. Top surface 35 and bottom surface 37 are located in parallel radial planes of the longitudinal axis of test tool 17. Seal 25 has a generally rectangular transverse cross-section. Seal 25 is preferably approximately of 70–80 Durometer hardness.

An upper reinforcing ring 39 is located in the upper inner corner near the intersection of seal inner surface 31 with seal top surface 35. A lower reinforcing ring 41 is located at the lower inside corner, near the intersection of seal inner surface 31 with bottom surface 37. Reinforcing rings 39, 41 are preferably of a multi-strand cable. The material may be of metal or a strong composite filament. The reinforcing rings 39, 41 have a very high tensile strength so that they will not stretch under normal operations of the test tool. These normal operations include the retrieval of test tool 17 through the blowout preventer (not shown). The tensile strength is sufficient so that they are essentially nonexpansible circumferentially. The reinforcing rings 39, 41, if constructed of cable as preferred, will not be rigid. Each reinforcing ring 39, 41 is a single, continuous ring, with the ends joined together such as by welding or the like. Rings 39, 41 are embedded in seal 25 during the elastomeric molding process.

Seal 25 may also have two anti-extrusion rings 43, 45 as shown. Anti-extrusion rings 43, 45 are metal coil springs that encircle the seal 25 at the upper and lower outer corners. Coil spring 43 locates at the upper corner near the intersection of outer surface 33 with top surface 35. Coil spring 45 locates near the lower outer corner near the intersection of outer surface 33 with bottom surface 37. Coil springs 43, 45 will circumferentially stretch, unlike reinforcing rings 39, 41.

Preferably an annular elastomeric core 47 is placed inside each coil spring 43, 45 prior to molding seal 25. Cores 47 are circular in transverse cross-section and preferably of harder material than the elastomeric material of seal 25, having a hardness of about 100 Durometer. Each core 47 fits closely within the turns of the coil springs 43, 45. The harder material of cores 47 reduces the tendency for the cores to extrude through the turns of the coil springs 43, 45 during the molding process. The turns of the coil springs 43, 45 are approximately 0.010 inch apart from each other. If the core 47 material is too soft, some of the core material might extrude through the clearances between the turns during molding. As a result, during setting the coil springs 43, 45 might collapse. Coil springs 43, 45 serve to prevent extrusion of the corners while seal 25 is set and under test pressure. During the setting procedure, coil springs 43, 45 will expand circumferentially in order to accommodate the energizing movement.

In operation, test tool 17 will be lowered through the blowout preventer and positioned inside wellhead housing 11. The drill pipe will be manipulated to cause split ring 19 to engage grooves 15. The operator will manipulate the drill pipe to cause the compression flange 29 and mandrel 18 to move downward relative to the compression ring 27. Compression flange 29 will contact compression ring 27 and push it downward onto the top surface 35 of seal 25. The weight of the drill string causes the seal 25 to deform. The outer surface 33 of seal 25 moves radially outward, engaging the inner wall 13 of wellhead housing 11. During the outward movement, coil springs 43, 45 will circumferentially expand. Reinforcing rings 39, 41 will not undergo any radial outward force nor any circumferentially expansion. Seal inner surface 31 remains the same inner diameter both during the undeformed seal position and the engaged position.

The blowout preventer (not shown) is closed on the drill pipe above mandrel 18. Test pressure is applied between the blowout preventer and seal 25 to test the blowout preventer. The test pressure pushes downward on the mandrel, causing compression flange 29 to exert a greater force on compression ring 27, further deforming seal 25 into sealing engagement. Compression flange 27 moves downward until contacting an upper portion of the outer portion 21.

When it is desired to retrieve the test tool 17, split ring 19 will be retracted. Mandrel 18 and compression flange 29 will move upward relative to compression ring 27. This allows the outer surface 33 of seal 25 to return to its undeformed condition shown in FIG. 2, substantially flush with the cylindrical surface of test tool outer portion 21. As the operator pulls the test tool upward, friction, mechanical grip and differential pressure will act on the seal 25 as it is pulled through the blowout preventer. The reinforcing rings 39, 41 will prevent stretching of the seal 25, preventing seal 25 from being pulled from shoulder 23. Once at the surface, seal 25 may be reused again if no damage has occurred.

This invention has significant advantages. The reinforcing rings prevent the seal from being pulled from its shoulder on the test tool. This avoids the operator spending hours having to retrieve a seal left downhole. Also, it may prevent the seal from being damaged, allowing its reuse. The harder core of the anti-extrusion ring prevents crushing of the anti-extrusion ring.

While the invention has been shown in only one of its forms, it should be apparent to those skilled in the art that it is not so limited, but is susceptible to various changes without departing from the scope of the invention.

I claim:

1. In an oil well apparatus which is lowered into and retrieved from a well, the apparatus having a cylindrical shoulder wall which locates within a cylindrical inner wall of an outer tubular member of the well, an elastomeric seal carried by the apparatus and having an outer surface for sealing against the inner wall and an inner surface sealing against the shoulder wall of the apparatus, energizing means acting axially on the seal for moving the outer surface of the seal radially outward to an engaged position in sealing engagement with the inner wall, the improvement comprising:

an annular nonexpansible reinforcing ring embedded within the seal to prevent stretching of the inner surface of the seal when the apparatus is retrieved from the well, the reinforcing ring being located within the seal at a point closer to the inner surface of the seal than the outer surface of the seal and the outer surface of the seal being free of any radial expansion restraining structure so as to allow the outer surface of the seal to freely move outward to the engaged position.

2. The apparatus according to claim 1 wherein the ring is a cable.

3. The apparatus according to claim 1 wherein the ring is a metal cable.

4. The apparatus according to claim 1 wherein the seal has a rectangular transverse cross-section with the inner surface and outer surface being cylindrical.

5. The apparatus according to claim 1 wherein the seal has a rectangular transverse cross-section with the inner surface and outer surface being cylindrical, and wherein the ring is located next to the inner surface.

6. The apparatus according to claim 1 wherein the seal has a rectangular transverse cross-section with the inner surface and outer surface being cylindrical, defining corners on its outer surface, and wherein the apparatus further comprises at least one anti-extrusion coil spring embedded within the seal at one of the corners to prevent axial extrusion of the outer surface but allow the outer surface to freely radially expand to the engaged position.

7. The apparatus according to claim 1 wherein the seal has a rectangular transverse cross-section with the outer surface defining an upper outer corner and a lower outer corner, and wherein the apparatus further comprises an anti-extrusion coil spring embedded within the seal at the upper outer corner and an anti-extrusion coil spring embedded within the seal at the lower outer corner to prevent axial extrusion of the outer surface but allow the outer surface to freely radially expand to the engaged position.

8. The apparatus according to claim 1 further comprising at least one anti-extrusion coil spring embedded within the seal, the coil spring having an elastomeric core that is cylindrical in transverse cross-section and which has a hardness that is greater than a hardness of the elastomeric material of the seal.

9. In an oil well apparatus which is lowered into and retrieved from an outer tubular member of a well, the outer tubular member having an cylindrical inner wall, the apparatus having a shoulder with a cylindrical shoulder wall, the improvement comprising in combination:
   an elastomeric seal carried on the shoulder of the apparatus and having a rectangular transverse cross-section, having a cylindrical outer surface, a cylindrical inner surface in contact with the shoulder wall, a flat upper surface and a flat lower surface, defining upper and lower outer corners at the junctions of the outer surface with the upper and lower surfaces, and upper and lower inner corners at the junction of the inner surface with the upper and lower surfaces;
   energizing means engaging the upper surface of the seal and being downwardly movable for moving the outer surface of the seal radially outward to an engaged position in sealing engagement with the inner wall of the outer tubular member; and
   at least one annular reinforcing ring embedded within the seal adjacent the inner surface, the reinforcing ring having sufficient tensile strength to be substantially nonexpansible to prevent stretching of the inner surface of seal when the apparatus is retrieved from the well.

10. The apparatus according to claim 9 wherein the ring is a cable.

11. The apparatus according to claim 9 wherein the apparatus further comprises an anti-extrusion coil spring embedded within the seal at the upper outer corner and an anti-extrusion coil spring embedded within the seal at the lower outer corner to prevent axial extrusion of the outer surface but allow the outer surface to freely radially expand to the engaged position, and wherein each of the coil springs contains an elastomeric core of material harder than the elastomeric material of the seal, the core being cylindrical in transverse cross-section.

12. The apparatus according to claim 9 wherein the ring is located at one of the inner corners.

13. The apparatus according to claim 9 wherein the apparatus further comprises an anti-extrusion coil spring embedded within the seal at the upper outer corner and an anti-extrusion coil spring embedded within the seal at the lower outer corner to prevent axial extrusion of the outer surface but allow the outer surface to freely radially expand to the engaged position.

14. The apparatus according to claim 9 wherein there are two of the rings, each of the rings being located at one of the inner corners.

15. The apparatus according to claim 9 wherein the apparatus further comprises an anti-extrusion coil spring embedded within the seal at the upper outer corner and an anti-extrusion coil spring embedded within the seal at the lower outer corner, and wherein there are two of the rings, each of the rings being located at one of the inner corners.

16. A well tool which has a cylindrical wall and which is lowered into and retrieved from a cylindrical inner wall of a wellhead housing, comprising in combination:
   a shoulder formed on the cylindrical wall of the tool, having a cylindrical shoulder wall and a lower shoulder surface;
   an energizable elastomeric seal carried on the lower shoulder surface, the seal having a rectangular transverse cross-section, having a cylindrical outer surface which is substantially flush with the cylindrical wall of the tool prior to energizing the seal, a cylindrical inner surface in engagement with the shoulder wall, a flat upper surface and a flat lower surface in contact with the lower shoulder surface, defining upper and lower outer corners at the junctions of the outer surface with the upper and lower surfaces, and upper and lower inner corners at the junctions of the inner surface with the upper and lower surfaces;
   energizing means including an upper energizing member for moving downward against the upper surface of the seal, causing radial deformation of the seal to move the outer surface of the seal radially outward to an engaged position in sealing engagement with the inner wall of the outer tubular member;
   an annular reinforcing ring embedded within the seal at each of the inner corners, the reinforcing rings having sufficient tensile strength to be substantially nonexpansible, to prevent stretching of the inner surface of the seal when the well tool is retrieved form the well; and
   a pair of anti-extrusion coil springs, one of the springs embedded within the seal at the upper outer corner and one of the springs at the lower outer corner, the coil springs being expansible so as to allow the outer surface of the seal to freely radially expand to the engaged position but prevent axial extrusion of the corners of the seal.

17. The well tool according to claim 16 wherein each of the coil springs contains an elastomeric core which is cylindrical in transverse cross-section and which is of material harder than the elastomeric material of the seal.

18. A seal for a well tool, comprising in combination:
   an annular elastomeric member;
   an annular anti-extrusion coil spring embedded within and extending around the elastomeric member; and
   an annular elastomeric core which is cylindrical in transverse cross-section and which is located within the coil spring, the core having a hardness that is greater than a hardness of the elastomeric material of the elastomeric member.

* * * * *